July 11, 1967   A. J. SARKA   3,330,556
SHEET DELIVERY APPARATUS HAVING VACUUM MEANS
Filed June 11, 1965   5 Sheets-Sheet 1

INVENTOR
ALBERT J. SARKA
BY Hoffmann and Yount
ATTORNEYS

July 11, 1967  A. J. SARKA  3,330,556
SHEET DELIVERY APPARATUS HAVING VACUUM MEANS
Filed June 11, 1965  5 Sheets-Sheet 2
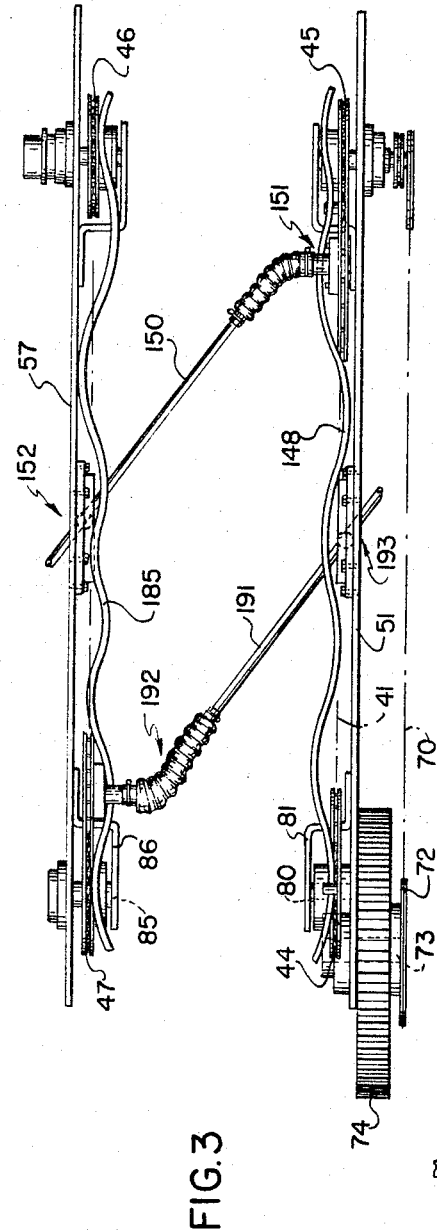
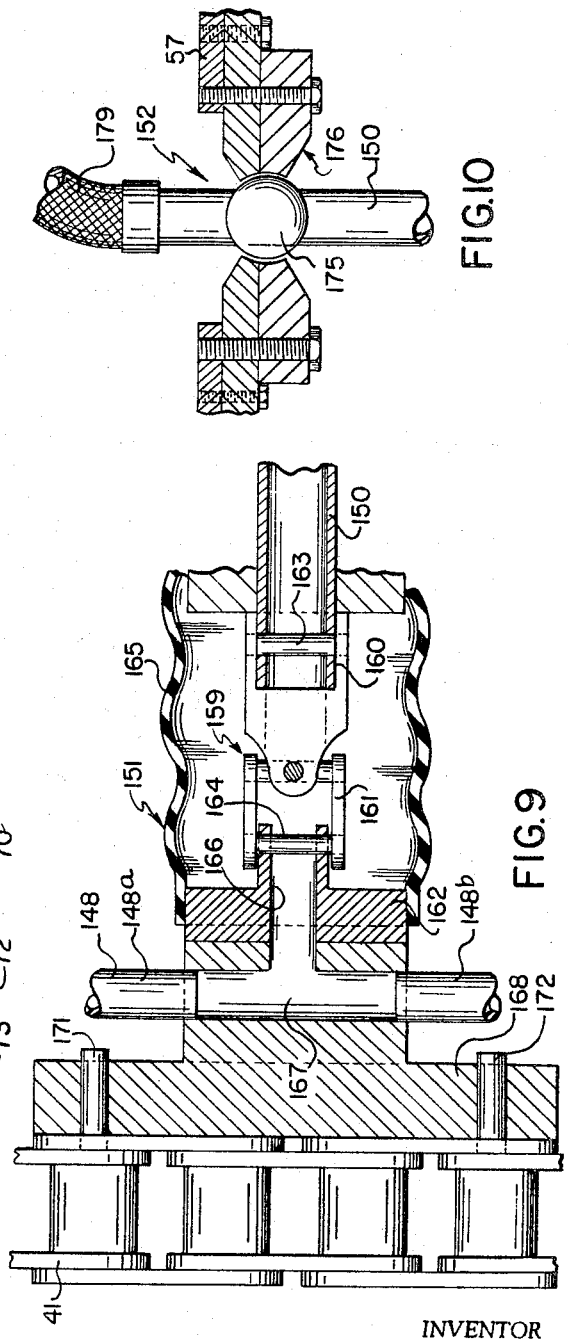
INVENTOR
ALBERT J. SARKA
BY Hoffmann and Yount
ATTORNEYS July 11, 1967 A. J. SARKA 3,330,556
SHEET DELIVERY APPARATUS HAVING VACUUM MEANS
Filed June 11, 1965 5 Sheets-Sheet 3

INVENTOR
ALBERT J. SARKA

BY *Hoffmann and Yount*

ATTORNEYS

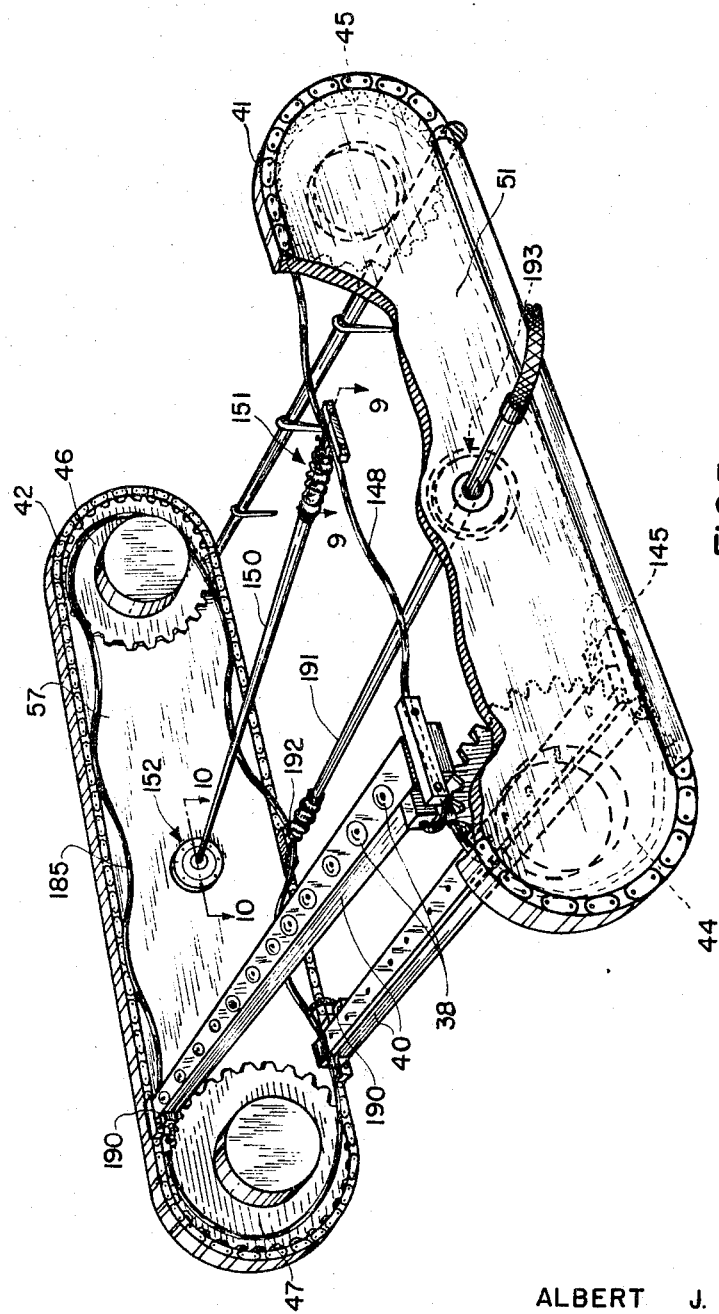

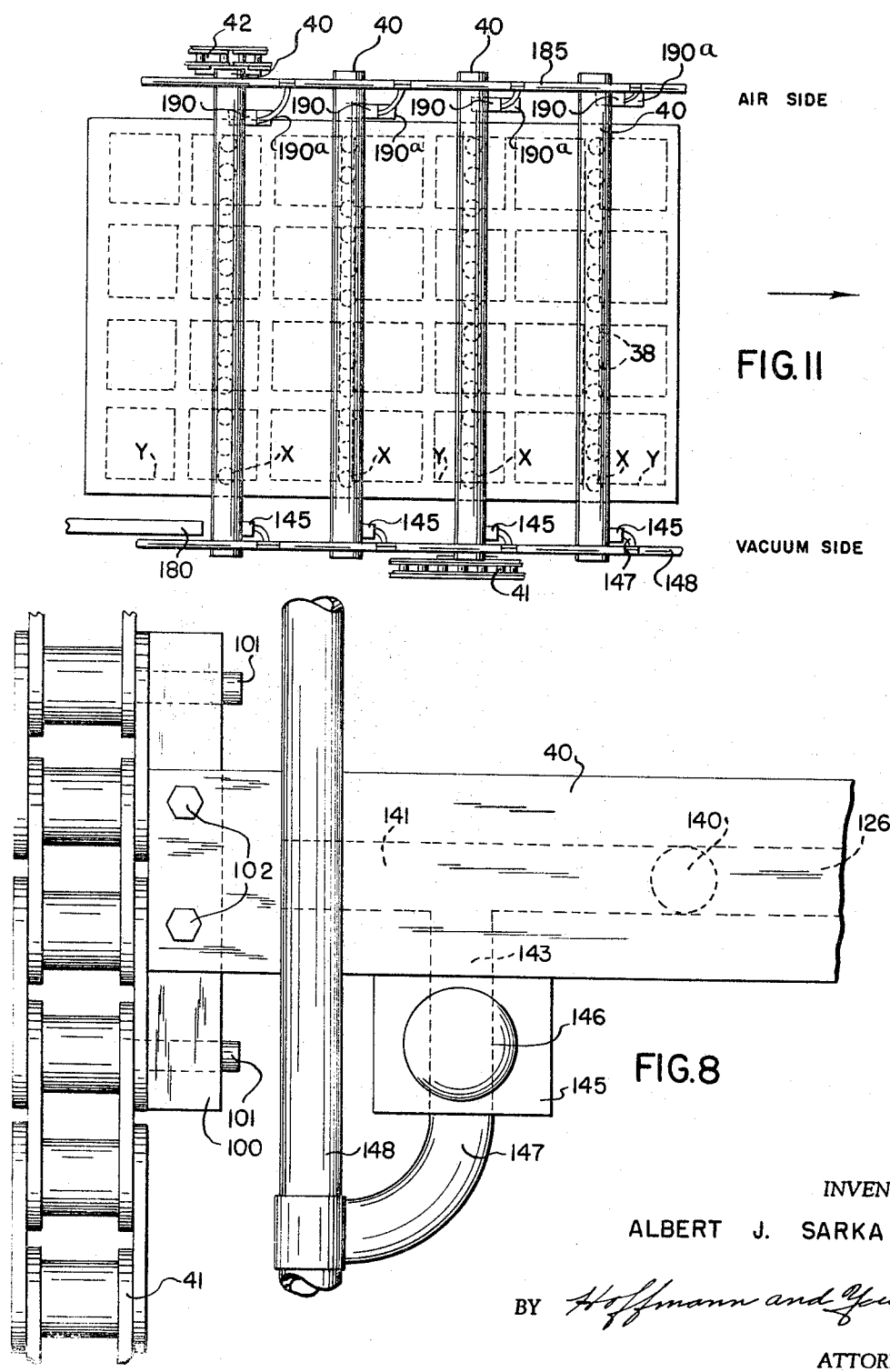

3,330,556
SHEET DELIVERY APPARATUS HAVING VACUUM MEANS
Albert J. Sarka, Fairview Park, Ohio, assignor to Harris-Intertype Corporation, Cleveland, Ohio, a corporation of Delaware
Filed June 11, 1965, Ser. No. 463,136
19 Claims. (Cl. 271—68)

The present invention relates to a delivery apparatus and, particularly, to a delivery apparatus utilizing movable material engaging sucker members for conveying sheet material from a processing machine.

Recent advances in the cutting and creasing field have created a need for a delivery mechanism for handling sheet material which has been cut and creased. The advances in the cutting and creasing field have been the development of a high-speed cutting and creasing process wherein cooperating dies effect the cutting and creasing of sheet material which is advanced between rotating cylinders carrying the dies. This cutting and creasing process is substantially shown and described in the United States patent issued to Downie, No. 3,142,233. A sheet is advanced through the dies and cut so as to provide a pattern therein defined by a plurality of cut lines which extend through the sheet. This process is normally used for cutting or blanking box blanks from sheet material. The cutting is such that the pattern cut from the sheet material is retained in the sheet by means of uncut portions connecting the cut-out pattern with the surrounding portions of the sheet material. The present invention is directed to the provision of a delivery apparatus for conveying such sheet material from the cutting and creasing apparatus and effecting piling thereof in a rapid and highly efficient manner.

A delivery apparatus embodying the present invention utilizes sucker members for engaging the sheet material and moving the material to a release position at which the material is released for dropping onto a pile. The apparatus specifically includes a first plurality of sucker members spaced transversely of the direction of movement of the sheet material and movable through a closed orbital path to engage and grip the sheet material near the leading end thereof and a second plurality of sucker members spaced transversely of the direction of material movement and movable through the closed orbital path for engaging and gripping the sheet material at a position spaced from the leading end thereof. The first and second plurality of sucker members referred to above are movable to move the sheet material to a release position at which the sheet is released from the sucker members and dropped so as to form a pile.

An object of the present invention is the provision of a new and improved delivery apparatus for handling in a rapid and efficient and reliable manner sheet material having a pattern cut therein defined by a plurality of cut lines and having a plurality of sucker members for engaging and gripping the sheet near the leading end thereof and another plurality of sucker members for engaging and gripping the sheet at a location spaced from the leading end thereof, and wherein the sucker members engage the sheet material so as not to overlie a cut line therein but rather engage the material at locations spaced from the cut lines defining the pattern therein.

A further object of the present invention is the provision of a new and improved delivery apparatus for handling sheet material having a pattern cut therein defined by a plurality of cut lines and having means for rendering sucker members which are located to engage the sheet material and overlie a cut line ineffective including means providing for movement of the sucker members out of position for engaging the sheet material and means for blocking the vacuum conduit for any sucker member which is moved out of position, thereby ensuring the proper gripping of the sheet material by other sucker members.

A still further object of the present invention is the provision of a new and improved delivery apparatus for handling material and including a plurality of sucker members movable in a closed orbital path for engaging the material and moving the material and a unique vacuum conduit system for providing a vacuum in said sucker members including a vacuum supply conduit connected at one end to move through an orbital path upon movement of the sucker members and having its other end fixed against such orbital movement.

Still a further object of the present invention is the provision of a new and improved delivery apparatus comprising a plurality of sucker members which are movable to engage and grip material and move the material to a release position where the material is released from the sucker members by means of a blast of air flowing therethrough, and wherein the sucker members are associated with a vacuum manifold and an air manifold, both of which are movable with the sucker members through a closed path of movement with the air and vacuum applied to the air and vacuum manifolds, respectively, by means of an air supply conduit and a vacuum supply conduit, respectively, which extend over the sheet material and transversely to the direction of movement thereof and are connected with their respective manifolds by means of universal joints providing for universal pivotal movement thereof relative to the manifolds and wherein the other ends thereof are associated with the frame of the machine providing for universal pivotal movement of the other ends thereof while the ends thereof connected with the respective manifolds move through the orbit with the sucker members.

Yet a further object of the present invention is the provision of a new and improved delivery apparatus having a plurality of sucker members which are movable through a closed path to engage and grip material and move the material to a release position, and wherein a vacuum manifold is associated with the sucker members to apply a suction thereto and an air manifold associated with the sucker members to apply an air blast therethrough to release the material therefrom, with the air and vacuum manifolds movable with the sucker members and a first valve member associated with the vacuum manifold to control communication between the vacuum manifold and the sucker members and a second valve member is associated with the air manifold to control the air blast through the sucker members, and wherein the valve members are movable with the sucker members and are actuated at predetermined times in the path of movement of the sucker members to provide for gripping of the material and release of the material by an air blast therethrough.

A still further object of the present invention is the provision of a new and improved delivery mechanism having a plurality of sucker members supported on bars, the opposite ends of which are carried on chain members and movable with the chain members through a closed orbital path and wherein the bars have a fluid passageway therein and the opposite ends thereof communicate with a vacuum and air manifold, respectively, and wherein a vacuum supply conduit and an air supply conduit communicating with the vacuum and air manifolds, respectively, extend between the chain members and overlie the path of movement of the sheet material with one end of each of the supply conduits moving through an orbital path with the manifold to which it is connected.

A delivery mechanism, as noted in the next preceding paragraph, wherein the spaced chain members are driven in timed relation by means of a drive mechanism which includes a drive shaft which is located above the chain members so as not to interfere with movement of the vacuum and air supply conduits.

Further objects and advantages of the present invention will be apparent to those skilled in the art to which it relates from the following detailed description thereof made with reference to the accompanying drawings forming a part of this specification and in which:

FIG. 3 is a top plan view with parts omitted of the delivery apparatus shown in FIG. 1;

FIG. 5 is a schematic perspective view illustrating the delivery apparatus of FIG. 1, with parts omitted;

FIG. 8 is a top plan view with parts omitted of the delivery apparatus of FIG. 6;

FIG. 9 is a fragmentary sectional view of the delivery apparatus of FIG. 5, taken approximately along the section line 9—9 of FIG. 5;

FIG. 10 is a fragmentary sectional view of the delivery apparatus of FIG. 5, taken approximately along the section line 10—10 of FIG. 5; and FIG. 11 is a schematic plan view of the delivery apparatus of FIG. 1.

Figure 1:
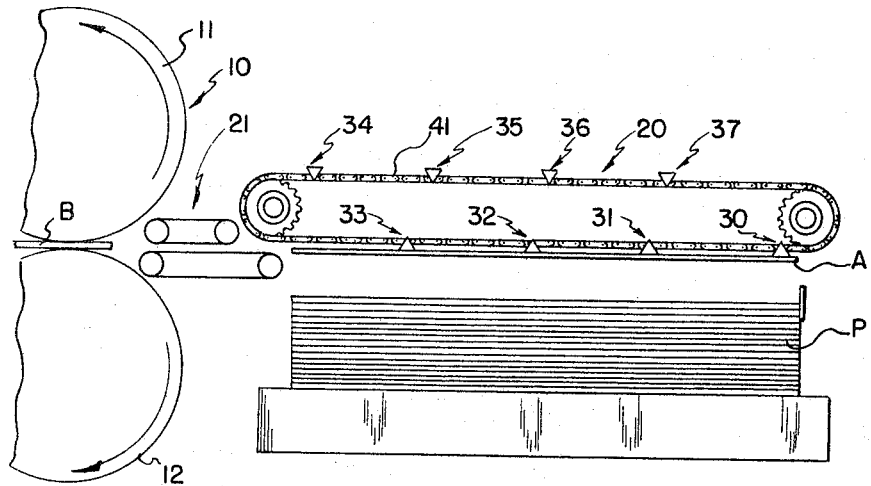
FIG. 1 is a schematic side elevational view of a delivery apparatus embodying the present invention.
Figure 2:
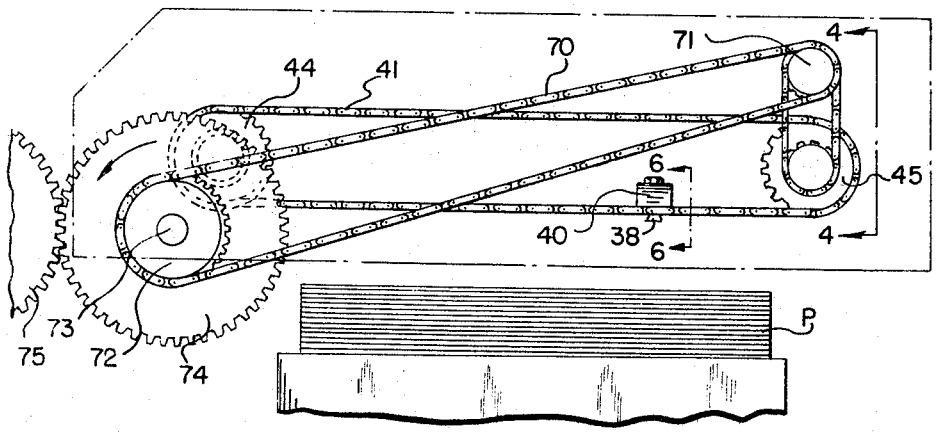
FIG. 2 is a side elevational view of the delivery apparatus of FIG. 1 with parts omitted and illustrating the drive therefor.

The present invention provides an improved delivery apparatus including material engaging sucker members for gripping and moving the material. The delivery apparatus of the present invention is usable for the handling of a variety of different materials and is particularly adapted for conveying material from a processing machine. The preferred embodiment of the present invention which is illustrated in the drawings and to be described in detail hereinbelow is illustrated as handling sheet material which is advanced through a cutting and creasing apparatus which cuts a pattern in the sheet material which is defined by a plurality of cut lines. This cutting and creasing method is generally described in Downie United States Patent No. 3,142,233.

As illustrated in FIG. 1, the cutting and creasing apparatus is generally designated 10. The cutting and creasing apparatus 10 includes a pair of cylinders 11, 12 which are adapted to carry cutting dies, not shown. As the cutting and creasing dies which are carried by the cylinders 11, 12 rotate, they operate on the sheet material which is advanced between the cylinders 11 and 12 to cut the sheet material and crease the material advanced between the rotating dies in a manner disclosed in the afore-mentioned Downie patent. The material which is advanced between the rotating cylinders 11 and 12 is cut so as to provide a pattern in the material which is defined by a plurality of cut lines. The pattern may be that of a box blank or a plurality of box blanks which may be folded to form a box. The sheet material is cut so that the box blank patterns defined by the cut lines are held in the sheet material by small uncut tab portions which secure the box blank pattern to the surrounding material.

The delivery apparatus embodying the present invention is especially adapted and constructed to handle sheet material having a pattern, such as a box blank, cut therein and defined by a plurality of cut lines as formed in the cutting and creasing apparatus 10. The sheet material which is advanced between the cylinders 10, 11 is fed by an advancing mechanism generally designated 21 to a delivery apparatus 20 embodying the present invention. The delivery apparatus 20, of course, is operable to take the sheet from the advancing mechanism 21 and move the sheet to a position wherein the sheet is dropped onto a pile. The advancing mechanism may be of any suitable construction and will not be described in detail. After a pile of sheets has formed, the pile may be moved for further processing where the box blanks are formed into boxes.

The delivery mechanism 20 for conveying the sheet material comprises a plurality of sets of sucker members, designated 30–37, and which are movable through a closed orbital path to engage the sheet material and convey the sheet to a release position where the sheet is released therefrom and may drop onto a pile. Each of the sets of sucker members 30–37 includes a plurality of spaced individual sucker members 38 which are spaced transversely of the direction of sheet movement. Each set of sucker members is carried by a bar 40 which extends transversely to the direction of movement of the sheet material. The opposite ends of the bars 40 are connected with chain members 41, 42 at spaced intervals. The chain members 41, 42 are driven, as will be described hereinbelow, to move the sets of sucker members through the closed orbital path of movement to engage the sheet material and carry the sheet material to a release position.

As the sets of sucker members move past the right end of the advancing mechanism 21, as viewed in the drawings, they engage and grip a sheet positioned thereat and then carry the sheet upon further movement thereof. As can be seen in FIG. 1, the sheet designated A therein has been gripped and carried by the plurality of sets 30–33 of sucker members to the release position from which the sheet A will be released to drop upon the pile P. The set 34 of sucker members upon continued movement of the chain members 41, 42 will engage the sheet B which is located in the nip of the cutting and creasing cylinders 11 and 12 when the leading end thereof reaches the right end of the advancing mechanism 21, as viewed in FIG. 1. Continued movement of the set 34 of sucker members will then cause the sheet B to be moved with the set 34 of sucker members and subsequently the sets 35–37 of sucker members will engage the sheet B and carry the sheet B to the position which is now occupied by the sheet A, as shown in FIG. 1. This operation continues on the various sheets so as to form a pile P.

From the above, it can be seen that as the chains 41, 42 move, the sucker members also move. The chain 41 is trained around a pair of sprockets 44 and 45, while the chain 42 is trained around a pair of sprockets 46 and 47. The sprockets 45 and 46 are driven in timed relation in order to effect driving of the chains 41 and 42 in a predetermined timed relation. The sprocket 45 is supported for rotation with a stub shaft 50, which, in turn, is supported for rotation relative to spaced frame members 51 and 52. The sprocket 45 is located between the frame members 51 and 52. The stub shaft 50 also carries a sprocket 54 on the end thereof opposite the end supported by the frame portion 52. The sprocket 46 for driving the chain 42 is mounted in a similar manner to the sprocket 45 for driving the chain 41. The sprocket 46 is carried on a stub shaft 55 which is supported by spaced frame portions 56 and 57. The stub shaft 55 also carries a sprocket 58 spaced outwardly of the frame member 57.

The sprockets 54 and 58 when driven effect a drive to the sprockets 45 and 46 and thereby effect driving of the chains 41, 42. The sprocket 54 is driven by a chain member 60 which extends vertically and is trained around the sprocket 54 and around a similar sprocket 61 which is mounted on a shaft 62 which extends across the delivery apparatus transversely of the direction of movement of the sheet material and is located above the sprockets 45 and 46 so as not to interfere with the movement of the sucker members. The sprocket 58 for driving the sprocket 46 is driven by a chain 63 which extends vertically and which is trained around a sprocket 64 also connected with the shaft 62 but at the end of the shaft opposite the end carrying the sprocket 61. From the above description, it should be apparent that upon rotation of the shaft 62, both the sprocket 45 and the sprocket 46 will be driven to effect driving of the chains 41 and 42 and thereby effect movement of the sucker members through their closed orbital path of movement.

The shaft 62 is driven by a chain 70 which cooperates with a sprocket 71 carried on the end of the shaft 62 adjacent the end of the shaft 62 which carries the sprocket 61. The chain 70 is trained around the sprocket 71 and is also trained around a sprocket 72 carried on a stub shaft 73 adjacent the forward end of the delivery apparatus 20, as viewed in FIG. 3. The stub shaft 73 also carries a gear 74 which meshes with a gear 75 driven in timed relation to the cylinders 11 and 12 of the cutting and creasing mechanism 10. Thus it should be clear from the above description that the chain members 41, 42 carrying the sucker members are driven in timed relation to the cutting and creasing mechanism 10.

The sprocket members 44, 47 for the chains 41, 42, respectively, are supported in the machine in a manner similar to that of the sprocket members 45, 46 previously described. The sprocket member 44 is carried on a stub shaft 80 which is rotatably supported by spaced frame portions 81 and 51. The sprocket 44 is located on the shaft 80 between the frame portions 81 and 51. The sprocket 47 is mounted on a stub shaft 85 which is rotatably supported by frame portions 86, 57. The sprocket 47 is located between the frame portions 86 and 57.

As noted hereinabove, the plurality of sets of sucker members 30–37 are each carried on a bar member 40 which extends transversely of the direction of movement of the sheet material. The opposite ends of each bar member 40 are connected with the chain members 41, 42, respectively. The particular construction of the bar members 40, their connection with the chain members 41, 42, and the arrangement of the sucker members thereon are identical and only one of the bar members will be described in detail herein.

The connection of a bar member 40 to the chain members 41, 42 at its opposite ends may be of any suitable construction. The connection must be such to permit movement of the bar member through the orbit defined by the chain members and around the sprockets about which the chain members are trained. As shown in the drawings, the chain member 41 carries a lug member 100 which is adapted to be inserted on spaced pins 101 carried by the chain so as to be movable with the chain. The bar member 40 carries a fastening means at its end which is in the form of screw fasteners 102 which are adapted to be screwed through a portion of the bar and into the lug 100 to secure the bar 40 to the lug 100. The lug 100 is associated with the chains so as to permit movement thereof around the sprockets in a conventional manner.

The chain members 41, 42 have a plurality of the pins 101 located thereon and the bars 40 may be moved relative to the chain members to vary the spacing therebetween and to provide any suitable positioning of the bars therealong. The position of the bars may be changed by loosening of screws 102, and then removal of the lug 100 from the pins 101 and positioning the lug 100 on other similar pins 101 spaced along the chain and then screwing the bar 40 onto the lug 100 at the new location thereof. The particular spacing of the bar members 40 along the chain members is such as to provide for the sucker members carried by the bars to engage the sheet material at the proper location depending upon the material being handled and the pattern which is cut into the sheet material. This spacing may be varied. Moreover, as shown in the drawing, eight bars 40 are provided to engage the sheet material, with the sucker members on four bars cooperating to carry one sheet. The number of bars cooperating to carry a sheet, of course, may also vary.

Figure 6:
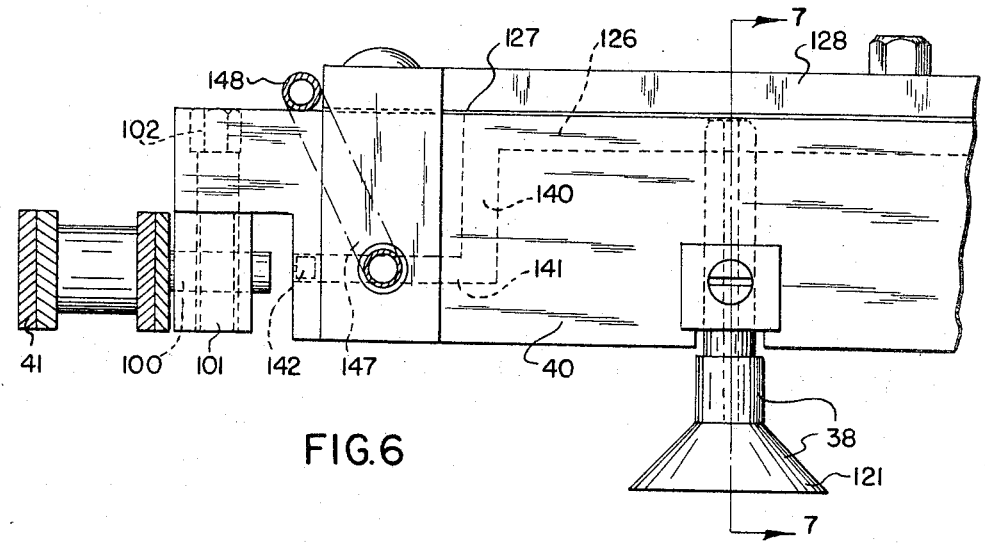
FIG. 6 is a fragmentary view of the delivery apparatus of FIG. 5, taken approximately along the line 6—6 of FIG. 2.

As noted hereinabove, each of the bars 40 carries a set of material engaging sucker members and the construction of each of the sucker members is identical to the others and the relationship of each of the sucker members to the bar 40 is identical. As shown in FIG. 6, the bar 40 shown therein carries a sucker member 38. The sucker member 38 has a sheet engaging portion 121 which lies in a plane with sheet engaging portions of the other sucker members of the set carried by the bar member 40. The portion 121 of the sucker member 38 engages the sheet and grips the sheet when suction is applied thereto to carry the sheet therewith.

The sucker member 38 is carried on the end of a stem 122. The stem 122 is received in a bore 123 in the bar 40. A suitable seal 124 is carried by the stem 122 and provides a seal between the bore 123 and the stem 122, for a purpose to be described hereinbelow. The stem 122 has a fluid passage 125 extending vertically, as shown in FIG. 6. The bar 40 includes a fluid passageway means and the fluid passage 125 communicates with a fluid passage 126 forming a part of the fluid passageway means. The passage 126 is formed as a groove in the upper portion of the bar, as viewed in FIG. 7, and the upper surface of the fluid passage 126 is defined by a rubber gasket 127 which is secured on the upper end of the bar 40 by means of screws which extend therethrough and through a holding bar member 128 and into the bar 40. It can be seen that when suction is applied to the passage 126, suction will be applied to the sucker members 38 carried by the bar.

The sucker members 38 carried by a bar 40 are constructed and arranged so that the sucker members engaging the sheet do not overlie a cut line on the sheet material, but rather engage the material at locations spaced from the cut lines defining the pattern therein. The sucker members 38 are fixed from transverse adjustment relative to the bar 40. However, if a sucker member is to engage the sheet material where there is a cut line in the sheet material or where there is an absence of material, that particular sucker member is rendered ineffective. Otherwise, a venting of the passage 126 will occur and thereby the entire set of sucker members will be ineffective to grip the sheet material. The particular means providing for rendering the sucker members ineffective provides for movement of the sucker members out of the position or plane in which they are located to engage the sheet material, and in this manner, the sucker members are permitted to be moved relative to the bar 40 into a position wherein they do not engage the material. At the same time, the vacuum leading to the sucker member which is moved so as not to engage the material is blocked. Thus the vacuum to the other sucker members of the set on the bar are not vented and thereby the sheet is properly engaged by the particular set of sucker members.

Figure 7:
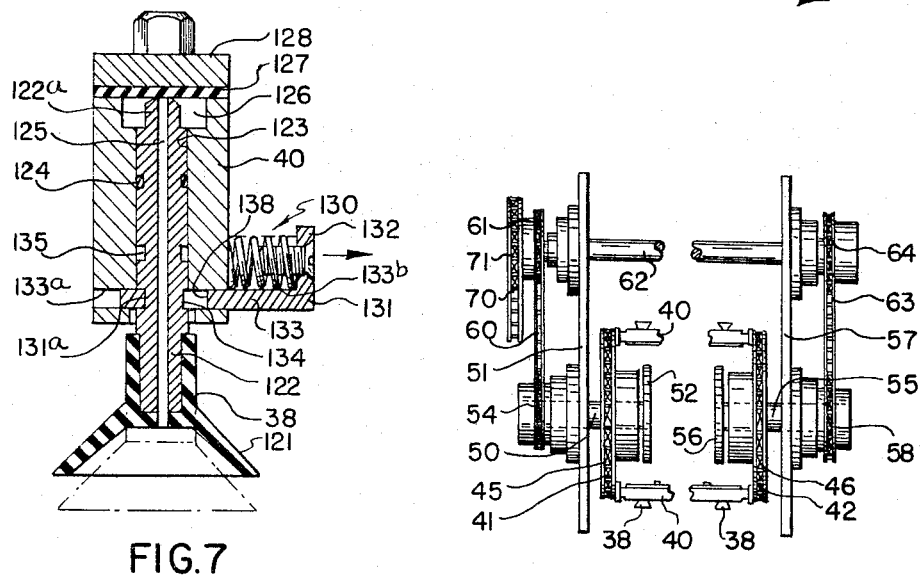
FIG. 7 is a sectional view of the delivery apparatus of FIG. 6, taken approximately along the section line 7—7 of FIG. 6.
Figure 4:
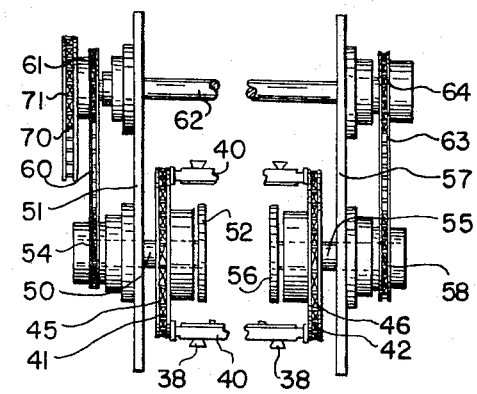
FIG. 4 is an end elevational view, looking at the delivery apparatus of FIG. 2 from the right thereof.

The means providing for movement of the sucker member out of the plane for engaging the sheet provides for manual movement of the stem 122 in the bore 123 between a location, shown in dot-dash lines in FIG. 7, wherein the sucker member is in position to engage the sheet to the full-line position shown in FIG. 7, wherein the sucker member is located so as to be above the plane of the sheet and thereby not engage the sheet. The stem 122 is moved vertically in the bore 123 manually. A suitable latch mechanism, generally designated 130, is associated with each of the sucker members and provides for holding the stem 122 thereof in the position to which it is moved.

The latch mechanism 130 comprises an L-shaped latch member 131 which has a vertically extending leg portion 132 and a leg portion 133 received in a slot 133a in the bar 40. A spring 133b acts between the leg portion 132 and the bar 40 biasing the latch member 131 in the direction of the arrow shown in FIG. 7 away from the bar 40. The stem 122 has an annular groove 134 therein corresponding with the raised position or inactive position of the sucker member and a second annular groove 135 therein corresponding with the inactive position of the sucker member. The leg portion 133 of the latch member 131 has an opening 138 therein through which the stem member 122 extends with clearance. The spring 133b biases the innermost portion 131a of the member 131 toward the position wherein the innermost portion 131a thereof is engaged in one of the slots 134, 135 in the stem member 122. The slot 134 receives the portion 131a when the stem 122 is in its inactive position and the slot 135 receives the portion 131a when the stem 122 is in its active position.

The stem member 122 may be moved to its vertical position, shown in full lines in FIG. 7, wherein the portion 121 thereof is located out of the plane of engagement with the sheet material by pressing the flange portion 132 of the latch 131 against the bias of spring 133b to a position wherein the innermost portion 131a thereof is located out of the groove 135. Then the stem portion 122 may be moved vertically relative to the opening 138 in the latch member 131. When the groove 134 is located adjacent to the innermost portion 131a of the member 131, the spring 133b will then bias the innermost portion 131a of the member 131 into the groove 134 and the stem will then be locked and held in its uppermost position.

The vacuum applied to a sucker member is blocked when the sucker member is moved to its inactive position, shown in full lines in FIG. 7. The vacuum is blocked by providing the stem 122 with a sufficient upward projection 122a so as to engage the rubber gasket 127 when the stem 122 is in its upper closed or inactive position. As shown in FIG. 7, the upper end of the stem is in engagement with the rubber gasket 127 and this provides for a blocking of the vacuum to the sucker member. The vacuum is specifically blocked due to the fact that the passage 126 is blocked from communication with the vacuum passageway 125 in the stem 122 of the sucker member. Thus, upon vertical movement of the sucker member out of the plane of the sheet, the vacuum is simultaneously blocked from the sucker member, thus rendering this particular sucker member ineffective to grip the sheet.

The fluid passageway means in the bar 40 not only includes the passage portion 126, described hereinabove, and which communicates with the fluid passageways 125 in the stems of the sucker members, but also includes a fluid passageway portion 140 extending vertically and which communicates with the passageway portion 126 and a fluid passageway portion 141 which extends horizontally, as shown in FIG. 6, and communicates with the fluid passageway portion 140. The left end of the passageway portion 141, as shown in FIG. 6, has a plug 142 therein which plugs the passageway 141 from communication with the atmosphere. The bar member 40 also includes a fluid passageway portion 143 which extends from the forward face of the bar 40 into communication with the fluid passageway 141.

The vacuum in the fluid passageways in the bar 40 is controlled by a valve 145 which is carried by the bar 40. The valve 145 is a normally closed valve having an actuating portion 146 which, when depressed, causes opening of the valve. The valve 145 is connected, as will be described hereinbelow, with a suitable supply of vacuum and when the valve 145 is opened, a vacuum is provided in the fluid passageways in the bar 40 so as to provide a vacuum at those sucker members which are in operative position. The valve 145 has an opening which communicates with the fluid passageway 143 when it is secured on the bar member 40. The valve 145 also has an opening therein which is connected with a suitable connection 147. The connection 147 connects the valve 145 to a vacuum manifold 148.

The vacuum manifold 148 is in the form of a flexible conduit which extends around the chain 41 and adjacent to each of the valves 145 mounted on the respective bars 40. The vacuum manifold 148 is continuously provided with a vacuum therein and when the valves 145 open, the vacuum in the vacuum manifold 148 communicates with the vacuum passageway in the bars 40. Vacuum is applied to the vacuum manifold 148 by a vacuum supply conduit 150 which extends transversely of the direction of movement of the sheet material and has one end connected with the vacuum manifold 148 by a suitable connecting means 151 and its other end is connected with the frame portion 57 of the delivery apparatus, substantially centrally thereof by means of a suitable connection 152 which allows for movement of the end of the conduit which is connected with the vacuum manifold 148 through an orbit with the chain member 41, while the other end of the vacuum supply conduit is connected with a suitable source of vacuum.

The connecting means 151 which connects the vacuum conduit 150 to the vacuum manifold 148 may be of any suitable structure and is best shown in FIG. 9. In general, it comprises a universal joint structure 159 including a first universal joint member 160 connected with the adjacent end of the conduit 150 and a second universal joint member 161 which is connected with the first member 160 for universal pivotal movement relative thereto and is also connected with a member 162. The universal joint member 160 is pinned to the conduit 150 for pivotal movement relative thereto about a pin 163, while the portion 161 of the universal joint is pinned by means of a pin 164 to a tubular portion of the member 162 for pivotal movement relative thereto. The universal joint is enclosed by means for a suitable sealing arrangement which includes a flexible sleeve 165.

The member 162 is provided with a fluid passageway 166 which communicates with a fluid passageway 167 in the shape of a T in a lug member 168. The fluid passageway in the member 166 communicates with the interior portion of the sleeve 165 which, in turn, communicates with the vacuum supply conduit 150, thereby providing a vacuum in the passageway 166. The passageway 167 intersects opposite sides of the member 168 and is connected with the opposite ends 148a, 148b of the vacuum manifold 148. The lug member 168 to which the member 162 is connected is suitably connected with the chain 41 by means of pin members 171 and 172 which are carried by the chain 41 in much the same manner as that described hereinabove for connection of the bars 40 to the chain members.

As noted above, the end of the vacuum conduit 150 opposite the end connected with the chain 41 is connected to the frame portion 57 for universal pivotal movement relative thereto by a suitable connecting means 152. The connecting means 152, best seen in FIG. 10, comprises a suitable ball member 175 which slidably receives the vacuum supply conduit 150 for sliding movement relative thereto. The ball 175 is secured in a suitable housing 176 for universsal pivotal movement relative thereto. The housing 176, of course, is secured to the frame member 57. Thus, it should be clear that upon movement of the end of the vacuum supply conduit 150 which is connected with the chain 41 with the chain, the end of the conduit which is connected to the frame 57 may move in a sliding relation to the ball 175 inwardly and outwardly of the frame portion 57 and may also pivot universally relative thereto. In this manner, the connection 152 allows for movement of the end of the conduit 150 connected with the chain throughout its closed orbit thereof. The end of the conduit supported by the connection 152 is connected with a vacuum supply by a suitable flexible conduit 179, which does not interfere with the movement of the end of the conduit 150 to which it is connected.

From the above description, it should be readily apparent that the vacuum manifold 148 continuously has a vacuum applied thereto and that the vacuum may be applied to the bar members and to the sucker members particularly carried by the bar members by actuation of the particular vacuum valve 145 associated with the bar member. Moreover, it should be clear from the description hereinabove, that upon the depression of the actuator member for the valves 145 associated with each of the bars, a vacuum is applied to the sucker members carried by the bar. The valves 145 carried by the bars are actuated by means of a cam 180, shown in FIG. 11. The cam 180 is located adjacent to the sprocket 44 and is operable to engage the actuating portions 146 of each of the valve members 145 associated with the bars as the bars move therepast. The cam 180 is of a length sufficient to hold the valve 145 actuated in order to provide a suction in the sucker members which is sufficient to hold the sheet thereon.

When the sucker members move into engagement with the sheet material with the vacuum therein, the sheet material is engaged and gripped thereby and is carried by the sucker members therewith. When the next bar for the next plurality of sucker members moves so as to cause the valve 145 carried thereby to engage the cam 180, the vacuum is applied therein and the sucker members carried thereby also engage the sheet material and carry the sheet material therewith. As described above, no suction is applied to those sucker members which overlie a cut line, and the sucker members designated X in FIG. 11 are rendered inoperative for they overlie a cut line Y in the sheet material. The sucker members, of course, move the sheet to a release position.

When the sheet has been moved to its release position, the sheet is released from the sucker members and means is provided for effecting a release of the sheet from the sucker members when the sheet arrives at the release position. The means for releasing the sheet material in the present embodiment comprises an arrangement for providing a blast of air through the sucker members when the sheet arrives at the release position. In order to provide a blast of air through the sucker members which are gripping the sheet, it is necessary to close valves 145. This may be accomplished immediately prior to the application of the air blast to the sucker members, or it may be performed substantially earlier after the sheet has been gripped by the sucker members, since, even though the vacuum valve 145 is closed, a vacuum will remain in the vacuum passageway in the bars 40 for some time.

The air blast to the sucker members is provided by means of an air system which is similar to that described hereinabove in connection with the vacuum system and in view of the similarity thereof, will not be described in great detail. The delivery apparatus includes an air manifold 185 which is located adjacent to the chain 42 and connected for movement with the chain 42 as the vacuum manifold 148 is connected for movement with the chain 41. The air manifold 185 is associated with the fluid passageway 126 in the same manner as the vacuum manifold is associated therewith. Suitable air valves 190 shown in FIG. 11 are mounted on the bars 40 on the end thereof opposite the end mounting the vacuum valves 145. The valves 190 communicate with the air manifold 185 in the same manner as the valves 145 communicate with the vacuum manifold. Air thus can be applied to the fluid passageway in the bar 40 by merely actuating the valves 190. The valves 190 are actuated when the sheet material is moved to its release position and in the embodiment shown a separate cam member, each of which is designated 190a and illustrated in FIG. 11, is located to engage the separate valves 190 and actuate the valves 190 to apply an air pressure in the fluid passageway in the bars 40 and thereby apply an air blast to the sucker members blowing the sheet therefrom. The cams 190a are shown staggered transversely of the direction of sheet movement and the valves 190 are likewise staggered so that each valve is actuated only by its cam.

An air pressure is continuously applied to the air manifold 185 by an air supply conduit 191 which extends transversely of the path of movement of the sheet material and between the chain members 41, 42. One end of the air supply conduit 191 is connected with the chain member 42 by a connecting means 192, similar to the connecting means 151 described hereinabove in connection with the vacuum supply conduit 150 and, in view of the similarity, will not be described in detail. The end of the conduit 191 which is connected with the chain 42, of course, moves with the chain 42 upon movement thereof. The other end of the conduit 191 is connected with the frame member 51 by means of a suitable connection 193, similar to the connection 152 described hereinabove in connection with the vacuum conduit 150. The connection 193, of course, provides for universal pivotal movement of the end of the conduit 191 connected with the frame 51 and also provides for sliding movement of the conduit 191 relative to the frame 51 upon movement of the other end of the conduit 191 with the chain 42 in the same manner as described hereinabove in connection with the vacuum conduit 150. The end of the conduit 191 associated with the connection 193 is connected by a flexible conduit to a source of air pressure, and which does not interfere with the sliding and pivoting movement of the end of the conduit 191 to which it is connected. The connections of the conduits 191 and 150 are such that the conduits 191 and 150 do not interfere with each other upon movement of the chains 41, 42. The opposite ends of the conduits 150 and 191 which are connected with the respective chain members 41 and 42 are spaced sufficiently so as to provide for suitable clearance between these members while the chain members move.

From the above description, it should be readily apparent that applicant has provided a new and improved delivery apparatus which includes sucker members for gripping material and conveying the material to a release position. In the event that the sucker members would engage individual items, a sorting operation could be performed by merely releasing the individual items at separate locations. For example, any items carried by the set of sucker members designated 30 could be released at a forwardmost position, while any items carried by the set of sucker members 31, 32 and 33 may be released at a different position, thus providing for automatically releasing the items at separate positions and thereby providing for sorting of the items in this manner.

Moreover, from the above description, it should be readily apparent that applicant has provided a new and improved delivery apparatus for handling of material, and that certain modifications, changes, and adaptations may be made therein by those skilled in the art to which it relates, and it is hereby intended to cover all such modifications, changes, and adaptations therein which come within the scope of the appended claims.

Having described my invention, I claim:

1. A delivery apparatus for conveying in a predetermined direction sheet material having a pattern cut therein defined by a plurality of cut lines comprising a first plurality of sucker members spaced transversely of the direction of movement of said sheet material and movable through a path to engage and grip a sheet at locations spaced from said cut lines therein and at the leading end thereof, a second plurality of sucker members spaced transversely of the direction of movement of said sheet material and movable through said path to engage and grip the sheet gripped by said first plurality of sucker members at locations spaced from said cut lines and spaced from the leading end thereof, means for applying a suction to said sucker members prior to engagement thereof with the sheet material to render said sucker members operable to grip the sheet material when the sucker members reach a predetermined location in the path of movement thereof including vacuum conduit means for connecting said sucker members to a source of vacuum, means for moving said first and second plurality of sucker members through said path to cause said first and then said second plurality of sucker members to engage and grip a sheet and move said sheet to a release position, and means for effecting release of said sheet from said first and second plurality of sucker members by the time that said sheet is moved thereby to said release position.

2. A delivery apparatus for conveying in a predetermined direction sheet material having a pattern cut therein defined by a plurality of cut lines comprising a pair of spaced movable endless chain members extending in said predetermined direction, bar members connected at their opposite ends to said chain members and movable through a closed path upon movement of said chain members, a first plurality of sucker members carried on a first one of said bar members and spaced transversely of the direction of movement of the sheet material and operable to grip a sheet at locations spaced from said cut lines, a second plurality of sucker members carried by another of said bar members and spaced transversely of the direction of movement of said sheet material and operable to grip a sheet at locations spaced from said cut lines therein, a fluid passageway in each of said bar members communicating with said sucker members, means providing a suction in said fluid passageway to render said sucker members operable to grip sheet material, means for driving said pair of spaced chain members to cause said first plurality of sucker members to engage and grip a sheet at the leading end thereof and said second plurality of sucker members to engage and grip said sheet at a location spaced from the leading end thereof, and means for effecting release of said sheet from said first and second plurality of sucker members by the time that said sheet is moved thereby to a release position.

3. A delivery apparatus for conveying in a predetermined direction sheet material having a pattern cut therein defined by a plurality of cut lines comprising a first plurality of sucker members spaced transversely of the direction of movement of said sheet material and movable through a closed orbital path to engage and grip a sheet at locations spaced from said cut lines therein and at the leading end thereof, a second plurality of sucker members spaced transversely of the direction of movement of said sheet material and movable through said path to engage and grip the sheet gripped by said first plurality of sucker members at locations spaced from said cut lines therein and spaced from the leading end thereof, a vacuum manifold movable with said first and second plurality of sucker members through a closed orbital path upon movement of said sucker members and connected therewith to provide a vacuum therein, means for moving said first and second plurality of sucker members through said path to cause said first and second plurality of sucker members to grip a sheet and move the sheet to a release position, a vacuum supply conduit extending transversely of the direction of movement of the vacuum manifold and operatively connected therewith at one end for movement with said vacuum conduit and to provide a vacuum therein and connected with a supply of suction at its other end, means associated with said other end of said vacuum supply conduit allowing for movement of said one end thereof with said vacuum manifold through an orbital path while connected with said vacuum supply, and means for effecting release of said sheet from said first and second plurality of sucker members by the time that said sheet is moved thereby to said sheet release position.

4. A delivery apparatus as defined in claim 3 further including an air manifold operatively associated with said sucker members and movable therewith in a closed path upon movement thereof, first valve means controlling communication between said vacuum manifold and said sucker members and second valve means for controlling communication between said air manifold and said sucker members, and means for closing said first valve means prior to movement of said sheet material to its said release position and means for opening said second valve means to provide a blast of air through said sucker members when said sheet is located at said release position.

5. A delivery apparatus as defined in claim 4 further including an air supply conduit extending transversely of the path of movement of the sheet material and operatively connected at one end for movement with said air manifold and to apply an air pressure therein and operatively connected at its other end with a supply of air which is fixed against movement with said air manifold.

6. A delivery apparatus as defined in claim 5 wherein said vacuum supply conduit and said air supply conduit overlie the sheet material being delivered by said delivery apparatus.

7. A delivery apparatus as defined in claim 6 wherein the opposite ends of said vacuum supply conduit and said air supply conduit are associated with universal joint means providing for universal pivotal movement of said one ends of said conduits relative to their respective manifolds and the other ends of said conduits relative to a frame portion of the apparatus.

8. A delivery apparatus as defined in claim 3 further including means for rendering ineffective those sucker members which are located to engage the sheet and overlie one of said cut lines including means providing for movement out of position of those portions of the sucker members which are located to engage the sheet and overlie one of said cut lines and means for blocking the passageway in said bar member associated with those sucker members which are located to engage the sheet and overlie one of said cut lines.

9. A delivery apparatus for conveying material in a predetermined direction comprising a pair of spaced movable endless chain members, bar members connected at their opposite ends to said chain members and movable through a closed path upon movement thereof with said chain members, sucker members carried by each of said bar members, a fluid passageway in said bar members communicating with said sucker members, a vacuum manifold located at one end of said bar members and movable upon movement of the bar members and connected with said fluid passageway, an air manifold located at the other end of said bar members and movable therewith and connected with said fluid passageway, first valve means movable with said bars for controlling communication between said vacuum manifold and said fluid passageway, second valve means movable with said bars for controlling communication between said air manifold and said fluid passageway, means for actuating said first valve means to apply suction to said sucker members at a predetermined location in the path of movement of said sucker members, and means for actuating said second valve means to provide an air blast through said sucker members when said material is moved to a release position.

10. A delivery apparatus as defined in claim 9 including a vacuum supply conduit connected at one end with said vacuum manifold and at its other end with a supply of vacuum, a first universal joint means connecting said one end of said vacuum conduit with said vacuum manifold and providing for universal pivotal movement of said one end of said vacuum conduit relative to said vacuum manifold upon movement of said vacuum manifold with said chain member and a second universal joint means operatively connecting said other end of said vacuum conduit for universal pivotal movement relative to a first frame portion and providing for universal pivotal movement and sliding movement of said vacuum conduit relative to said first frame portion upon movement of said vacuum manifold.

11. A delivery apparatus as defined in claim 10 including an air supply conduit connected at one end with said air manifold and at its other end with a supply of air, a third universal joint means connecting said one end of said air conduit with said air manifold and providing for universal pivotal movement of said one end of said air conduit relative to said air manifold upon movement of said air manifold with said chain member and a fourth universal joint means operatively connecting said other end of said conduit for universal pivotal movement relative to a second frame portion and providing for universal pivotal movement and sliding movement of said air conduit relative to said second frame portion upon movement of said air manifold.

12. A delivery apparatus comprising a pair of spaced movable endless chain members, bar members connected at their opposite ends to said chain members and movable through a closed orbital path upon movement of said chain members, sucker members carried by said bar members and operable to engage and grip material at a predetermined location in the path of movement thereof and to carry the material upon further movement thereof, a fluid passageway in said bar members communicating with said sucker members, a vacuum manifold located at one end of said bar members to apply a vacuum thereto and movable through a closed orbital path upon movement of said bar members, vacuum conduit means extending between said chain members and having one end communicating with said vacuum manifold to apply a vacuum thereto and connected therewith to move with said vacuum manifold through said closed path and connected at its other end with a vacuum supply, and universal joint means associated with said other end of said conduit and located substantially centrally of said orbit allowing for said movement of said one end thereof while said other end thereof is connected with said vacuum supply.

13. A delivery apparatus as defined in claim 12 further including drive means for said chain members including a drive shaft extending above said chain members and a separate drive train from said drive shaft to said chain members and located outwardly of said chain members so as not to interfere with movement of said vacuum conduit means upon movement thereof.

14. A delivery apparatus for conveying material in a predetermined direction comprising a plurality of sucker members spaced transversely of the direction of movement of the material and movable through a closed path to engage and grip the material and to carry the material therewith, a vacuum manifold movable through a closed path with said sucker members and communicating with said sucker members to apply a vacuum thereto, vacuum conduit means extending transversely of the direction of material movement and having one end communicating with said vacuum manifold to apply a vacuum thereto and connected at its other end with a vacuum supply fixed from movement with said vacuum manifold, a first universal joint interconnecting said one end of said conduit and said vacuum manifold permitting universal pivotal movement of said vacuum conduit relative to said manifold, and a second universal joint associated with said other end of said vacuum conduit and allowing for universal pivotal movement thereof while said one end moves through said closed path.

15. A delivery apparatus as defined in claim 13 wherein said second universal joint is supported by a frame portion and said vacuum conduit is supported thereby for sliding movement relative to said frame.

16. A delivery apparatus for conveying material in a predetermined direction comprising a first plurality of sucker members spaced transversely of the direction of movement of the material and movable through a predetermined path, said first plurality of sucker members having portions lying in a common plane to engage and grip the material and to carry the material therewith, a second plurality of sucker members movable through said path and spaced transversely of the direction of movement of the material, each of said second sucker members having portions lying in a common plane to engage and grip the material and to carry material therewith, means for moving said first and second plurality of sucker members through said path to engage and grip material and move the material to a release position, vacuum passage means associated with each of said sucker members to provide a vacuum at said portion thereof, means for effecting release of said material from the first and second plurality of sucker members when the material is moved to the release position, means providing for movement of selected material engaging portions of said first and second plurality of sucker members out of said plane, and means for blocking vacuum to said vacuum passage of said selected first and second plurality of sucker members.

17. A delivery apparatus for conveying in a predetermined direction sheet material having a pattern cut therein defined by a plurality of cut lines comprising a first plurality of sucker members spaced transversely of the direction of movement of said sheet material and movable through a path to engage and grip a sheet located in a predetermined location at the leading end thereof and to convey said sheet therewith, a second plurality of sucker members spaced transversely of the direction of movement of said sheet material and movable through said path to engage and grip the sheet gripped by said first plurality of sucker members at a location spaced from the leading end thereof and to convey said sheet therewith upon further movement thereof, means for moving said first and second plurality of sucker members through said path to engage and grip said sheet and move said sheet to a release position, means for effecting release of said sheet from said first and second plurality of sucker members simultaneously when said sheet is moved thereby to said release position, and means for rendering ineffective those sucker members of said first and second plurality of sucker members which are located to engage the sheet and overlie one of said cut lines.

18. A delivery apparatus for conveying in a predetermined direction sheet material having a pattern cut therein defined by a plurality of cut lines comprising a first plurality of sucker members spaced transversely of the direction of movement of said sheet material and movable through a predetermined path, each of said first plurality of sucker members having portions lying in a common plane to engage and grip a sheet at the leading end thereof and to carry said sheet therewith upon movement thereof, a second plurality of sucker members movable through said path and spaced transversely of the direction of movement of a sheet, each of said second plurality of sucker members having portions lying in a common plane to engage and grip the sheet gripped by said first plurality of sucker members at a location spaced from the leading end thereof and to carry said sheet therewith upon further movement thereof, means for moving said first and second plurality of sucker members through said path to engage and grip said sheet and move said sheet to a release position, vacuum passage means associated with each of said sucker members to provide a vacuum at said portion thereof, means for effecting release of said sheet from said first and second plurality of sucker members simultaneously when said sheet is moved thereby to said release position, means providing for movement out of said plane of those sheet engaging portions of said first and second plurality of sucker members which are located to engage the sheet and overlie one of said cut lines, and means for blocking said vacuum passage of those first and second plurality of sucker members which are located to engage the sheet and overlie one of said cut lines.

19. A delivery apparatus for conveying in a predetermined direction sheet-like material and comprising a first plurality of sucker members spaced transversely of the direction of movement of said sheet-like material and movable through a path to engage and grip a sheet at the leading end thereof, a second plurality of sucker members spaced transversely of the direction of movement of said sheet-like material and movable through said path to engage and grip the sheet gripped by said first plurality of sucker members at locations spaced from the leading end thereof, means for applying a suction to said sucker members prior to engagement thereof with the sheet-like material to render said sucker members operable to grip the sheet-like material when the sucker members reach a predetermined location in the path of movement thereof including vacuum conduit means for connecting said sucker members to a source of vacuum, means for moving said first and second plurality of sucker members through said path to cause said first and then said second plurality of sucker members to engage and grip a sheet and to move said sheet to a release position, and means for effecting release of said sheet from said first and second plurality of sucker members by the time that said sheet is moved thereby to said release position.

References Cited

UNITED STATES PATENTS

| | | | |
|---|---|---|---|
| 1,634,196 | 6/1927 | Jones | 271—74 |
| 1,957,621 | 5/1934 | Styron | 271—74 |
| 1,987,336 | 1/1935 | Powell | 214—6 |
| 3,101,942 | 8/1963 | Zyber | 271—68 |
| 3,202,302 | 8/1965 | Insolio | 271—74 X |

FOREIGN PATENTS

| | | |
|---|---|---|
| 1,058,938 | 6/1959 | Germany. |

M. HENSON WOOD, Jr, *Primary Examiner.*

ALLEN N. KNOWLES, *Examiner.*